H. C. HUBBELL.
STORAGE BATTERY.
APPLICATION FILED DEC. 7, 1909.
1,113,348.
Patented Oct. 13, 1914.
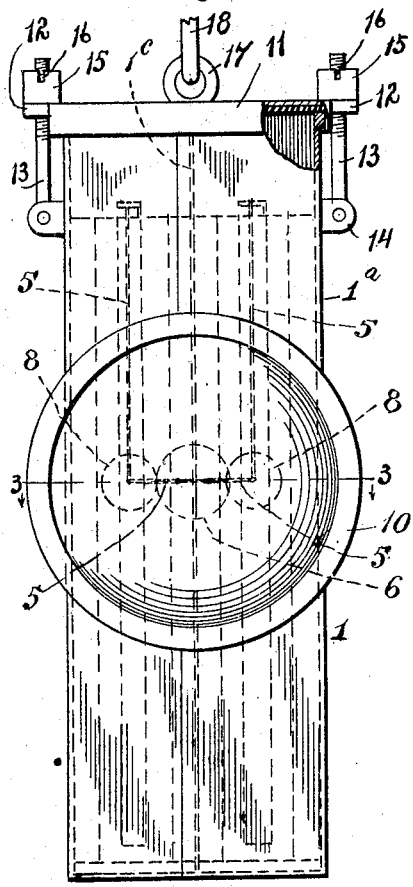
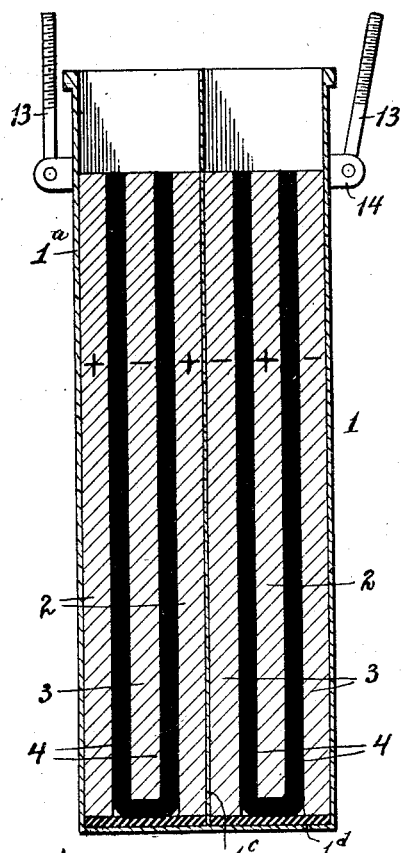
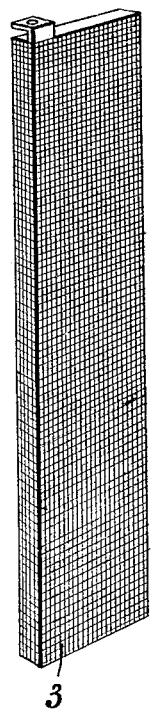
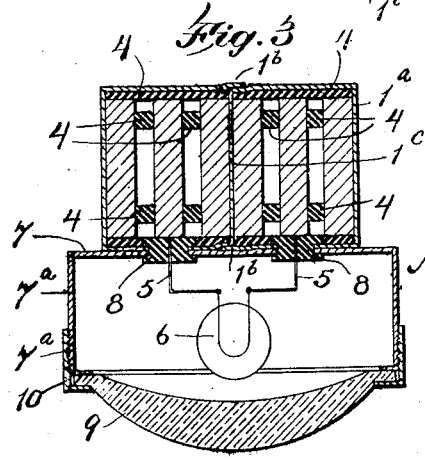
Witnesses.
F. D. Smith
Alan C. McDonnell
Harry Cross Hubbell
Inventor
by A. L. Cherry
Attorney

UNITED STATES PATENT OFFICE.

HARRY CROSS HUBBELL, OF NEWARK, NEW JERSEY.

STORAGE BATTERY.

1,113,348.   Specification of Letters Patent.   Patented Oct. 13, 1914.

Application filed December 7, 1909. Serial No. 531,761.

*To all whom it may concern:*

Be it known that I, HARRY CROSS HUBBELL, a citizen of the United States, and resident of Newark, county of Essex, State of New Jersey, have invented certain new and useful Improvements in Storage Batteries, of which the following is a specification.

My present invention relates to storage batteries and more particularly my improvements have for their object reducing size and weight and thereby producing a portable battery especially adapted for a variety of uses such as its use in connection with an incandescent lamp to be carried by miners. Their further object is to produce a battery in which the casing shall not be substantially attacked by the electrolyte and which is therefore characterized by durability.

The improvements by which this is accomplished relate both to details of construction of the battery and its combination with the lamp, and also to a new combination between the battery casing, its electrodes and electrolyte whereby one electrode in each cell of the battery is adapted to be in contact with the casing, whereby space is saved and greater compactness is secured.

In the drawings which show only one of the forms which my invention may take, Figure 1 is a front elevation of a storage battery within my invention, Fig. 2 is a vertical section partly in elevation of the battery in Fig. 1, the section being taken on a plane parallel with the plane of the paper, and the cover of the battery being removed, Fig. 3 is a horizontal section partly in plan taken on the line 3—3 in Fig. 1, and Fig. 4 is a perspective view of one of the electrodes or elements.

Describing now the devices of the drawings and reserving it to the claim to point out the novel features and to define the scope of the invention, it being understood that said claim is to be given a proper range of equivalents, 1 designates the casing of the battery, said casing being made of metal preferably Monell metal, which is an alloy containing approximately 70% of nickel and 30% of copper. In addition, the casing may be made of other metals, such as iron nickel-plated, or nickel or copper, not acted upon by alkaline electrolytes. The sides $1^a$ of the casing consist of a single strip of the metal bent into the general form of an S. Each free edge $1^b$ of this strip overlaps the opposite loop of the S and is brazed thereto to close said loops.

$1^d$ is the metal bottom of the casing brazed to the sides $1^a$ and to the partition $1^c$ whereby a metal casing is formed having two cells. An alkaline electrolyte is used with the battery. Thus, a solution of an alkaline carbonate, etc., may be employed but a solution of a caustic alkali such as caustic soda is preferred. The alkaline electrolyte has no substantial effect upon the metal of the casing. Each cell contains a positive and a negative element or elements. Thus, 2 designates the positive elements and 3 the negative.

In Fig. 2 the negative element 3 in the left hand cell is insulated from the casing, whereas the positive elements 2 adjacent the opposite faces of the negative element are in contact with the casing. On the other hand, in the right hand cell there are two negative elements 3 in contact with the casing and a single positive element 2 which is not in contact with the casing.

It will be noted that all of the elements extend parallel to the partition $1^c$ between the cells, said arrangement securing compactness. For the same reason the elements are all brought snugly together, thin strips 4 of rubber or other insulating material being interposed between the middle elements and their adjacent elements and between the middle elements and the casing. The insulated elements of the two cells are of opposite polarity and are the terminal elements of the battery from which proceed the leads 5 that connect with the lamp 6.

It will be noted that the elements that contact with the casing in the two cells are of opposite polarity. This means that the metal casing forms the necessary electrical connection between them so that a wire connection is superfluous. Furthermore, greater compactness is secured by the fact that the aforesaid elements can contact with the casing instead of being separated therefrom by a space after the usual manner.

Each of the electrodes consists of active material held in a perforated container which may be made of iron-wire gauze nickeled. The active material of the positive electrodes is preferably a mixture of 60% of silver oxid and 40% of nickel hydrate. This mixture is compacted into the containers and is then electrolytically reduced to the metals and then reoxidized. The active material of the negative electrodes is preferably a mixture of 60% of cadmium oxid and 40% of nickel hydrate compacted in their containers and reduced to the metals. The battery assembled as described, using an alkaline electrolyte, constitutes a two unit series storage battery and as such gives twice the voltage of one cell.

7 is a metal base having a cylindrical wall $7^a$, the base being secured directly to the front wall of the casing without interposed insulation, this being unnecessary in spite of the fact that the metal base overlaps both cells because, as already shown, the battery is operative without the necessity of insulating the cells from each other. Through the base 7 are two openings registering with corresponding openings through the casing into the respective cells. The leads 5 from the terminal elements come out from the cells through these openings.

8 are insulating bushings which insulate the leads from the casing.

6 is a suitably supported insulated lamp with which connect the leads 5. A switch (not shown) may be interposed in obvious manner, also a rheostat whereby the current can be cut off at will from the lamp or its quantity regulated to give greater or less brilliancy to the light.

9 is a glass bull's-eye closing the mouth of the metal base 7 and removably secured thereon by a screw ring 10 which engages threads on the sides $7^a$ of said base.

The top of the casing is closed by a cover 11 having vertically perforated lugs 12 receiving through them the screw-threaded ends of bolts 13 hinged to the casing at 14.

15 are nuts engaging the screw threads on said bolts and provided with screw driver slots 16 to engage with a screw-driver-like instruments for turning the nuts to lock the cover down, or vice versa to remove it. The cover has a ring 17 from which a hook 18 proceeds (only part of the hook being shown) for supporting and carrying the entire battery and outfit.

It will be understood in connection with the annexed claim that the several elements specified may be made up of one or more plates just as the positive element in the left hand cell in Fig. 2 is made up of two plates.

What I claim is:

In combination with a storage battery having a metal casing in contact with the electrolyte, the provision of a casing consisting of a single strip of metal bent into S-formation, each free end of said strip overlapping the opposite loop of the S and being brazed thereto, said casing having a bottom brazed thereto and a cover for its top.

Witness my hand this 24th day of November, 1909, at New York city.

HARRY CROSS HUBBELL.

Witnesses:
 E. W. SCHEN, Jr.,
 EDNA A. MORELAND.